(12) United States Patent
Jiang et al.

(10) Patent No.: US 11,008,429 B2
(45) Date of Patent: May 18, 2021

(54) METHODS AND COMPOSITIONS RELATING TO TUNABLE NANOPOROUS COATINGS

(71) Applicant: University of Florida Research Foundation, Inc., Gainesville, FL (US)

(72) Inventors: Peng Jiang, Gainesville, FL (US); Sin-Yen Leo, Hillsboro, OR (US); Calen Leverant, Gainesville, FL (US); Danielle Liu, Gainesville, FL (US); Yin Fang, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 106 days.

(21) Appl. No.: 16/277,579

(22) Filed: Feb. 15, 2019

(65) Prior Publication Data

US 2019/0185630 A1    Jun. 20, 2019

Related U.S. Application Data

(63) Continuation-in-part of application No. PCT/US2017/046886, filed on Aug. 15, 2017.

(60) Provisional application No. 62/375,172, filed on Aug. 15, 2016.

(51) Int. Cl.
| | | |
|---|---|---|
| *C08J 5/18* | (2006.01) | |
| *B01D 69/12* | (2006.01) | |
| *C08F 22/10* | (2006.01) | |
| *G02B 5/02* | (2006.01) | |
| *G02B 1/111* | (2015.01) | |
| *C08J 7/02* | (2006.01) | |
| *B01D 71/40* | (2006.01) | |

(52) U.S. Cl.
CPC ............ *C08J 5/18* (2013.01); *B01D 69/125* (2013.01); *C08F 22/1006* (2020.02); *C08J 7/02* (2013.01); *G02B 1/111* (2013.01); *G02B 5/0247* (2013.01); *G02B 5/0268* (2013.01); *G02B 5/0294* (2013.01); *B01D 71/40* (2013.01); *B01D 2321/18* (2013.01); *B01D 2323/24* (2013.01); *C08J 2335/02* (2013.01)

(58) Field of Classification Search
CPC .. B01D 69/125; B01D 71/40; B01D 2321/18; B01D 2323/24; C08J 5/18; C08J 7/02; C08J 2335/02; C08F 22/1006; G02B 1/111; G02B 5/0247; G02B 5/0268; G02B 5/0294
See application file for complete search history.

(56) References Cited

FOREIGN PATENT DOCUMENTS

WO      2015066337 A1     5/2015

OTHER PUBLICATIONS

International Search Report and Written Opinion issued in PCT/US2017/046886 dated Oct. 20, 2017.
Fang, et al. Reconfigurable photonic crystals enabled by pressure-responsive shape-memory polymers. Nature Communications. Jun. 15, 2015. vol. 6: 7416.

*Primary Examiner* — Patrick D Niland
(74) *Attorney, Agent, or Firm* — Thomas|Horstemeyer, LLP; Stephanie Davy-Jow

(57) ABSTRACT

Described herein are methods and compositions relating to tunable nanoporous coatings. In certain aspects, described herein are methods and compositions wherein a tunable nanoporous coating comprises a tunable nanoporous membrane which transitions from opaque to transparent upon the application of force, and from transparent to opaque after washing with a solvent.

17 Claims, 17 Drawing Sheets

FIG. 6
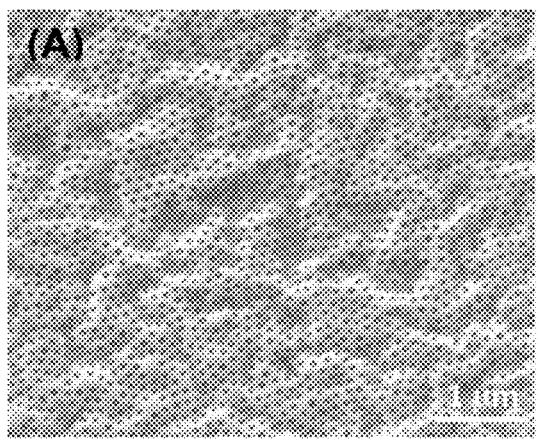
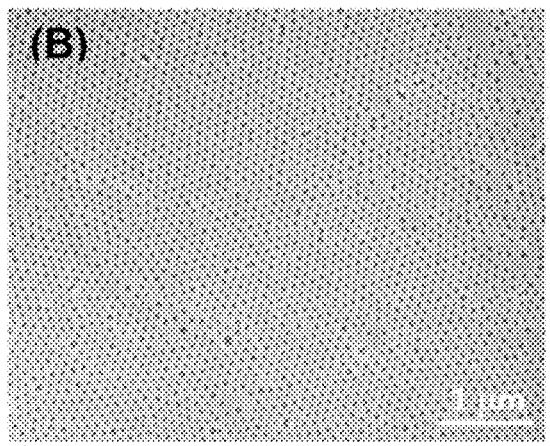
FIG. 7A　　　　　　　　　　　FIG. 7B

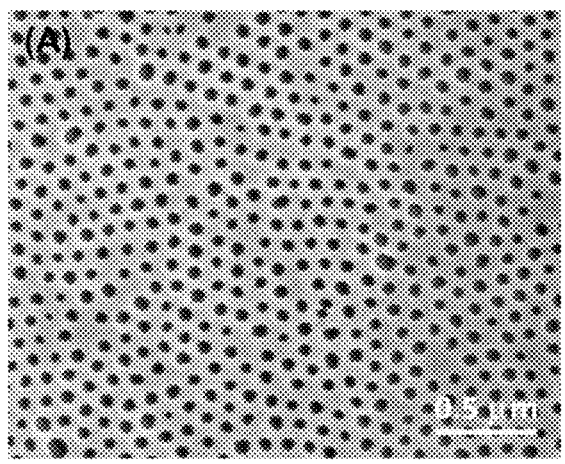
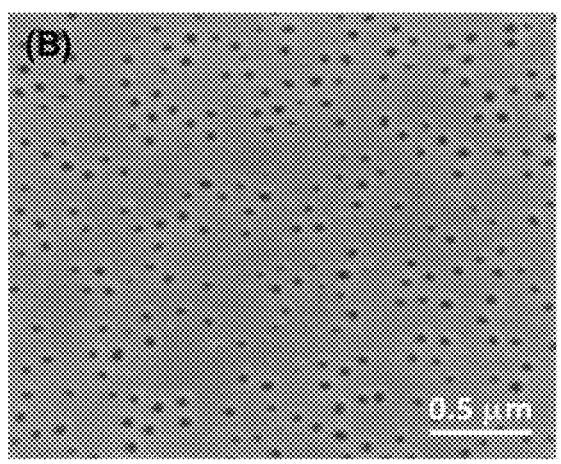
FIG. 10A            FIG. 10B
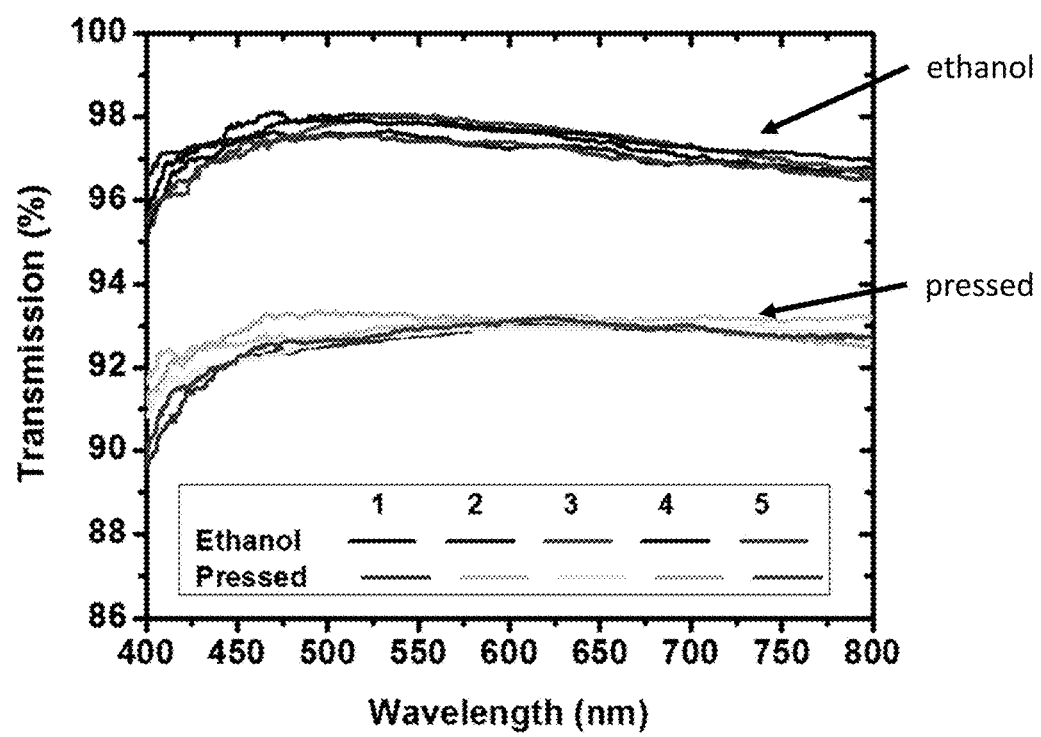
FIG. 11

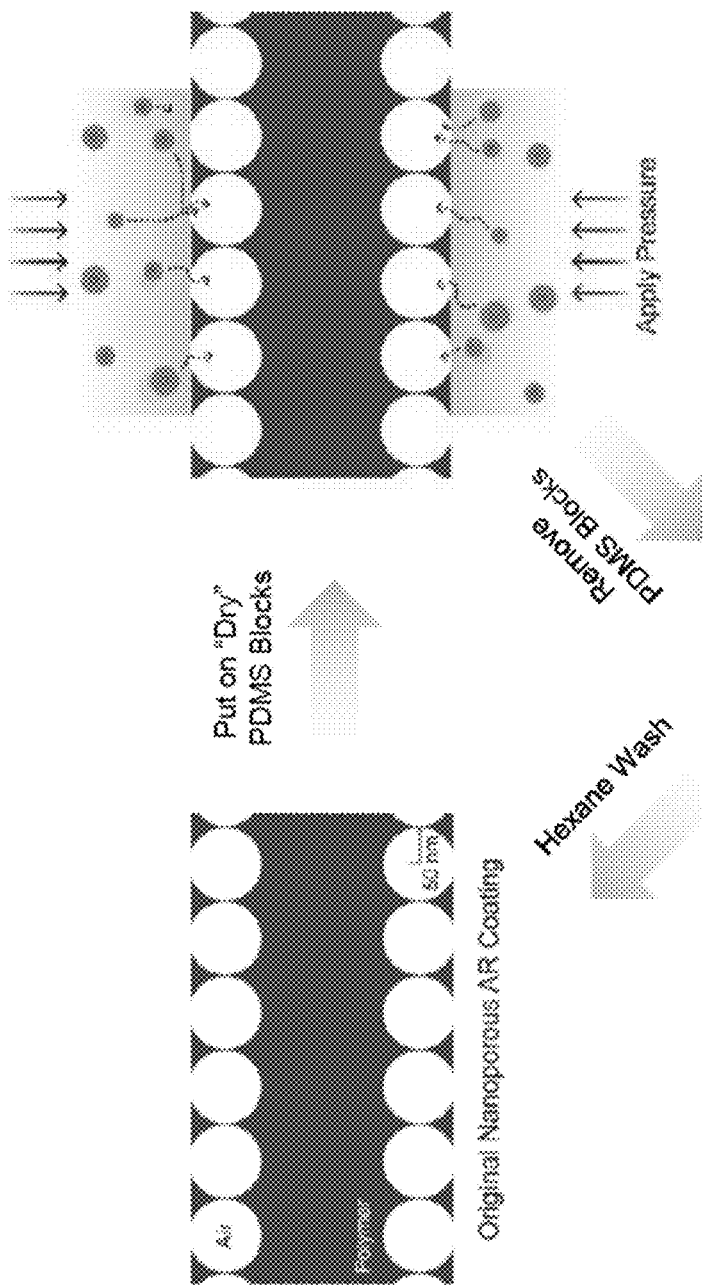
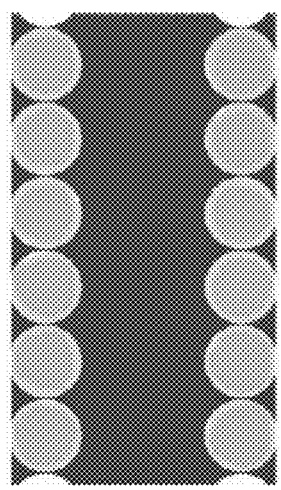
FIG. 13A
FIG. 13B
FIG. 13C

METHODS AND COMPOSITIONS RELATING TO TUNABLE NANOPOROUS COATINGS

CROSS-REFERENCE TO RELATED APPLICATION

This application is a continuation-in-part of International Patent Application entitled "METHODS AND COMPOSITIONS RELATING TO TUNABLE NANOPOROUS COATINGS", having serial number PCT/US2017/046886, with an international filing date of Aug. 15, 2017, which claims priority to U.S. provisional application entitled "METHODS AND COMPOSITIONS RELATING TO TUNABLE NANOPOROUS COATINGS," having Ser. No. 62/375,172, filed on Aug. 15, 2016, both of which are entirely incorporated herein by reference.

FEDERAL SPONSORSHIP

This invention was made with Government support under Contract/Grant No. HDTRA1-15-1-0022, awarded by the US Defense Threat Reduction Agency, Contract/Grant No NNX14AB07G, awarded by the NASA and US Defense Threat Reduction Agency, and Contract/Grant No CMMI-1562861, awarded by the National Science Foundation. The Government has certain rights in this invention.

BACKGROUND

Anti-reflection (AR) coatings are widely used in a spectrum of optical and optoelectronic devices, such as: monitors, car dashboards, optical lenses, photodiodes, and solar cells, for example. Although widely used, traditional quarter-wavelength antireflection coatings can only support passive operations. With the recent development of many smart devices, there is an urgent need to develop smart optical coatings that can regulate the light transmission and reflection, actively and passively. Tunable antireflection coatings that can change the optical transmission and reflection in an active or passive manner are therefore important for developing next generation smart optical and optoelectronic devices.

Currently available technologies that enable tunable antireflection coatings of optical and optoelectronic devices are very limited. Current technologies are additionally hampered by limitations that prevent their widespread adoption and implementation. For example, one previous approach uses tedious layer-by-layer assembly of polyelectrolytes to achieve antireflection tunability by controlling the opening and closing of nanopores. Unfortunately, this approach only works in aqueous solutions by tuning the pH values of the solution, limiting the application of this technology. Accordingly, there is a need to address the aforementioned deficiencies and inadequacies.

SUMMARY

Methods and compositions relating to tunable nanoporous coatings are described herein. In certain aspects, methods as described herein can comprise forming at least one silica layer with silica nanoparticles; transferring the silica layer onto at least one first surface of one or more substrates; creating a volume between the first surface and at least one opposing second surface of a second substrate; adding a monomer composition into the volume between the opposing first and second surfaces; polymerizing the monomer composition with a polymerization method to form a tunable polymer membrane; and removing the at least one silica layer on the one or more substrates with the first solvent. Methods can further comprise washing the tunable polymer membrane with a second solvent after removing the silica layers. Methods as described herein can further comprise transferring at least one silica layer onto at least one second surface of the second substrate.

In systems and methods as described herein, the silica nanoparticles are $SiO_2$ nanoparticles with a diameter of about 100 nm to about 10,000 nm. A silica layer of compositions and methods described herein can comprise a monolayer of colloidal silica crystals. Compositions and methods as described herein can comprise one or more substrates comprising glass.

Monomer compositions of compositions and methods described herein can comprise polymerized polyethylene glycol diacrylate (PEGDA), polyethylene glycol (600) diacrylate (PEGDA 600), ethoxylated trimethylolpropane triacrylate (ETPTA), ethoxylated (20) trimethylolpropane triacrylate (ETPTA 20), or a combination thereof.

The first solvent of methods as described herein can be 2% hydrofluoric acid. Methods as described herein can further comprise applying the tunable polymer membrane to a surface. Methods as described herein can further comprise tuning the tunable polymer membrane by a first tuning method to create a tuned polymer membrane. Methods as described herein can further comprise tuning the tuned polymer membrane with a second tuning method. A first tuning method in methods as described herein can be the application of a force. Other tuning methods, or a second tuning method, of methods as described herein can comprise the application of a solvent and drying the membrane. Methods as described herein can further comprise initiating a tuning cycle. A tuning cycle of methods as described herein can alter the optical transmission of the tunable membrane from below 94% to above 98% or above 98% to below 94%.

The tuning cycle of methods as described herein can comprise a first tuning method to create a first tuning state of the tunable polymer membrane followed by a second tuning cycle to create a second tuning state. Tuning cycles of methods as described herein can be repeated more than one time.

Methods as described herein can comprise a first tuning method, which can be selected from the group consisting of applying a force or immersing in a solvent and drying.

A first tuning method of methods as described herein can be selected from the group consisting of applying a force or immersing in a solvent and drying the membrane.

In an embodiment, a method for fabricating a tunable polymer membrane comprises assembling a polymer casting apparatus. The polymer casting apparatus can comprise a container configured to hold a first solvent and at least one or more substrates with at least one silica coated first surface. The container can be configured so at least one silica coated first surface of the one or more substrates opposes at least a second surface. The second surface can be uncoated or coated with the silica layer. A volume can exist in between the silica coated first surface and the second surface. The container can be further configured so the solvent can fully immerse at least the silica layer of the opposing silica coated first surface and the second surface.

In certain aspects, methods as described herein can comprise adding a monomer composition into a volume between the opposing first and second surfaces; polymerizing the monomer composition with a polymerization method to form a tunable polymer membrane; and removing the at least one silica layer on the one or more substrates with the first solvent. In certain aspects, methods as described herein can further comprise forming a silica layer with silica nanoparticles; and transferring the silica layer onto at least one surface of one or more substrates.

Compositions as described herein can be products of any of the methods described herein and result from the processes as described herein.

Described herein are embodiments of methods of tuning a tunable polymer membrane. Embodiments as described herein can comprise providing a tunable polymer membrane as described herein; and tuning the tunable polymer membrane with a first tuning method, thereby facilitating a first optical transition of the tunable polymembrane to a first tuning state.

The method can further comprise tuning the tuned polymer membrane with a second tuning method, thereby facilitating a second optical transition to a second tuning state.

The first tuning method can be the application of a mechanical force, and the first optical transition is transparent to opaque.

The second tuning method can be application of a solvent and drying the membrane, and the second optical transition is opaque to transparent.

Methods as described herein can further comprise initiating a tuning cycle wherein the first tuning state, second tuning state, or both are cycled for more than one cycle.

The tuning cycle can alter the optical transmission of the tunable membrane from below 94% to above 98% or above 98% to below 94%.

The application of force can be with a PDMS stamp comprising uncured PDMS oligomers configured to diffuse to the tunable polymer membrane upon the application of force with the PDMS stamp on the tunable membrane.

The first tuning method can be selected from the group consisting of applying a force or immersing in a solvent and drying.

The first tuning method can be selected from the group consisting of applying a force or immersing in a solvent and drying the membrane.

The first tuning method and second tuning method can be different.

The solvent can be ethanol or hexane.

Methods of tuning a tunable polymer membrane can further comprise: providing a tunable polymer membrane, wherein the tunable polymer membrane is fabricated by forming at least one silica layer with silica nanoparticles ($SiO_2$ nanoparticles with a diameter of about 100 nm to about 10,000 nm in an embodiment), transferring the at least one silica layer (which is a monolayer of colloidal silica crystals in an embodiment) onto at least one first surface of one or more substrates (which can comprise glass according to an embodiment), creating a volume between the first surface and at least one opposing second surface of a second substrate, adding a monomer composition (which can comprise comprises polymerized polyethylene glycol diacrylate (PEGDA), polyethylene glycol (600) diacrylate (PEGDA 600), ethoxylated trimethylolpropane triacrylate (ETPTA), ethoxylated (20) trimethylolpropane triacrylate (ETPTA 20), or a combination thereof) into the volume between the opposing first and second surfaces, polymerizing the monomer composition with a polymerization method to form a tunable polymer membrane, and removing the at least one silica layer on the one or more substrates with the first solvent (2% hydrofluoric acid in an embodiment). The fabrication method that creates the provided tunable polymer membrane can further comprise washing the tunable polymer membrane with a second solvent after removing the silica layers and can further comprise transferring the at least one silica layer onto at least one second surface of the second substrate; and tuning the tunable polymer membrane with a first tuning method, thereby facilitating a first optical transition of the tunable polymembrane to a first tuning state.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

FIG. 6 depicts a photograph of a polydimethoxysilane (PDMS)-stamped nanoporous ethoxylated trimethylolpropane triacrylate (ETPTA)/polyethylene glycol diacrylate (PEGDA) membrane.

FIG. 7A depicts a top-view scanning electron microscope (SEM) image of the high-glare region of the embodiment of the present disclosure shown in FIG. 6.

FIG. 7B depicts a top-view SEM image of the low glare region of the embodiment of the present disclosure shown in FIG. 6.

FIG. 10A depicts a top-view SEM image of the clear region of the embodiment of the present disclosure shown in FIG. 9.

FIG. 10B depicts a top-view SEM image of the glare region of the embodiment of the present disclosure shown in FIG. 9.

FIG. 11 illustrates normal-incidence optical transmission spectra obtained from an embodiment of a polymeric membrane cyclically pressed and dried out of ethanol.

FIGS. 13A-13C depict a schematic illustration of the process for achieving switchable antireflection properties of a nanoporous AR coating.

FIG. 13A shows a polyacrylate film with 110 mm nanopores showing good AR performance. FIG. 13B shows that when a PDMS blow without uncured oligomers were placed on the sample in FIG. 13A as indicated by the dotted rectangle, no degradation of AR performance occurred. FIG. 13C shows that when a PDMS block with ~10 wt. % PDMS oligomers was placed on the coating, the printed region became highly reflective. FIG. 13D shows that after a hexane was, the printed region in FIG. 13C recovered the original suitable AR performance.

FIG. 15A shows optical transmission measurements during 5 infusion-hexane wash cycles. FIG. 15B shows cyclic change in light transmittance at 500 nm wavelength during 5 switching cycles.

FIGS. 17A and 17B are top and cross-sectional views of an intact nanoporous AR coating according to the present disclosure. FIGS. 17C and 17D show the sample of FIGS. 17A-B after a PDMS oligomer infusion. FIGS. 17E and 17F show the sample of FIGS. 17C and 17D after a hexane wash.

DETAILED DESCRIPTION

Figure 1:
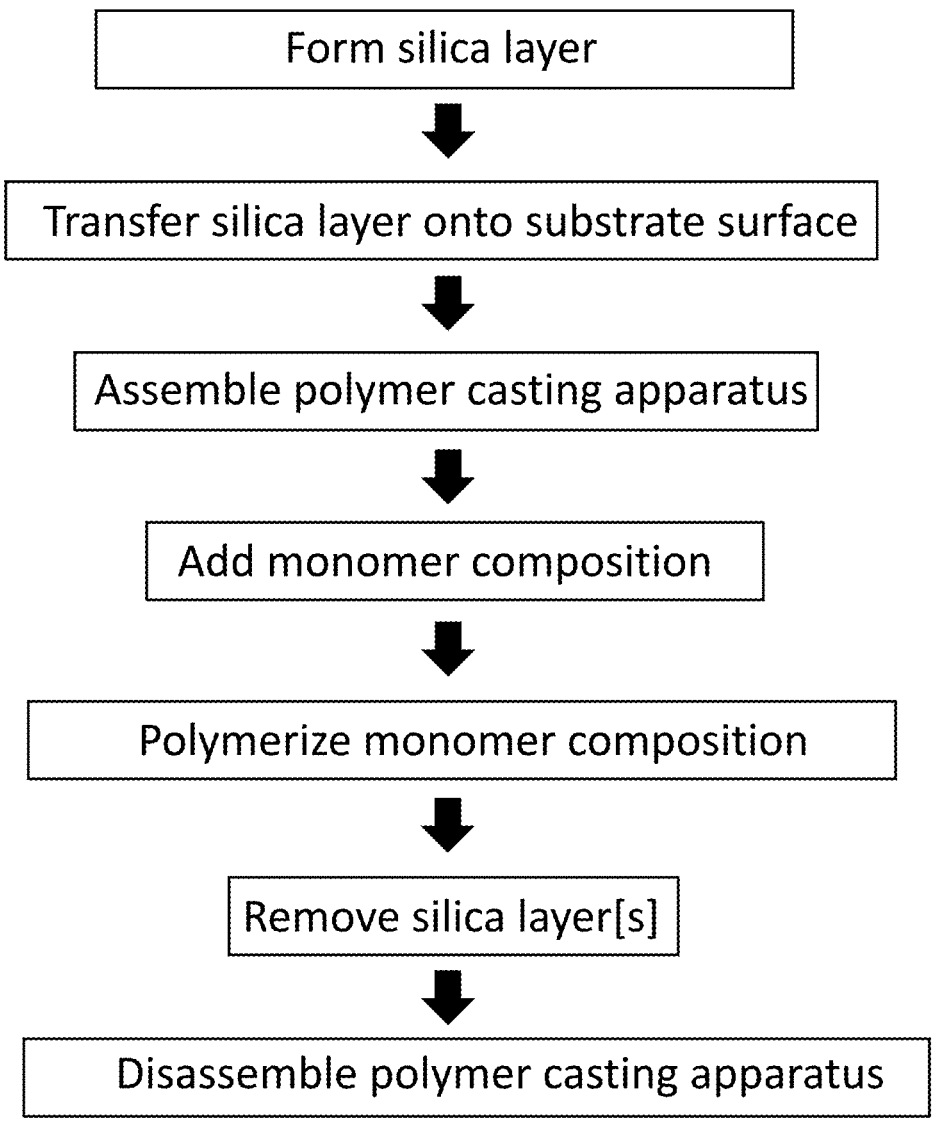
FIG. 1 illustrates an embodiment of a method for fabricating nanoporous polymer membranes using a silica monolayer template.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for methods and compositions of tunable nanoporous antireflection coatings. Tunable nanoporous antireflection coatings as described herein can be enabled by shape memory polymers.

Anti-reflection (AR) coatings are widely used in a spectrum of optical and optoelectronic devices. Applications of AR coatings can be found in examples such as: display monitors, car dashboards, optical lenses, photodiodes, and solar cells. Currently used traditional quarter-wavelength antireflection coatings can only support passive operations. With the recent development of many smart devices, there is an urgent need to develop smart optical coatings that can regulate the light transmission and reflection. Tunable antireflection coatings that can change the optical transmission and reflection are therefore important optical components for developing next generation smart optical and optoelectronic devices. Unfortunately, there are only very limited numbers of technologies available that enable tunable antireflection coatings. One previous approach is using tedious layer-by-layer self-assembly of polyelectrolytes to achieve antireflection tunability by controlling the open and closed states of nanopores. Unfortunately, this approach only works in aqueous solutions by tuning the pH values of the solution.

Described herein is a new methodology for achieving tunable antireflection using common shape memory polymers and/or their copolymers. It was discovered and described herein that a unique nanoporous structure can be enabled by a simple and scalable nanoparticle self-assembly technology. This technology can result in unusual "cold" programming and subsequent room-temperature recovery, which can be cycled, for a large variety of polymers. The tunable antireflection operations are described herein can be performed in a variety of environments, for example in both air and liquid solvents. The flexibility of the methods and compositions are described herein could greatly expand the application scopes of new, tunable, antireflection coatings for existing and next generation optics and optoelectronics.

Methods and compositions as described herein can generate novel smart optical coatings and optical surfaces with unique tunable antireflection properties. These tunable antireflection coatings can find important applications in regulating light transmission and reflection for a wide range of products, ranging from smart windows for energy-efficient building to brightness-adjustable displays.

Figure 2:
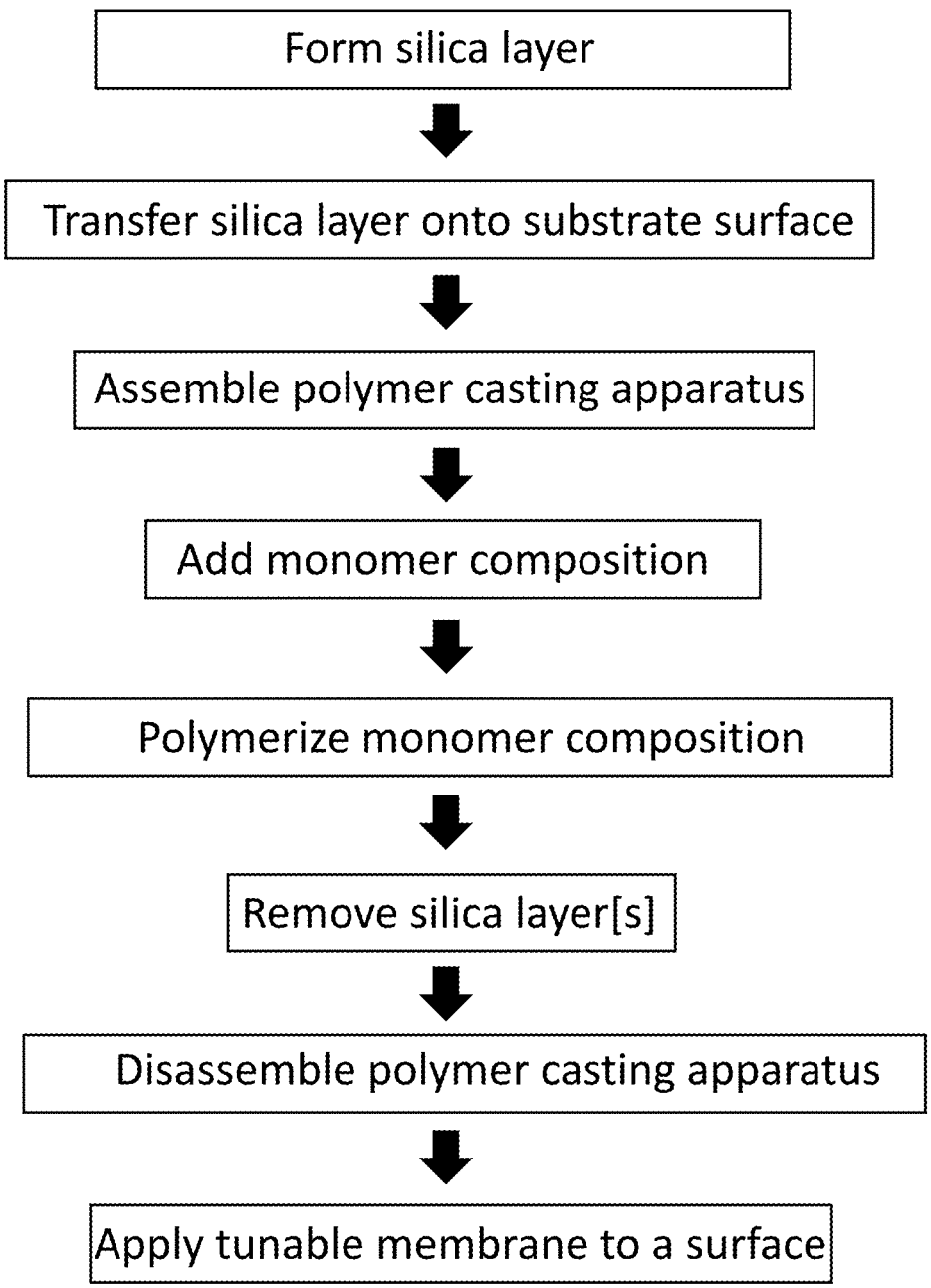
FIG. 2 illustrates a second embodiment of a method for fabricating nanoporous polymer membranes using a silica monolayer template.
Figure 3:
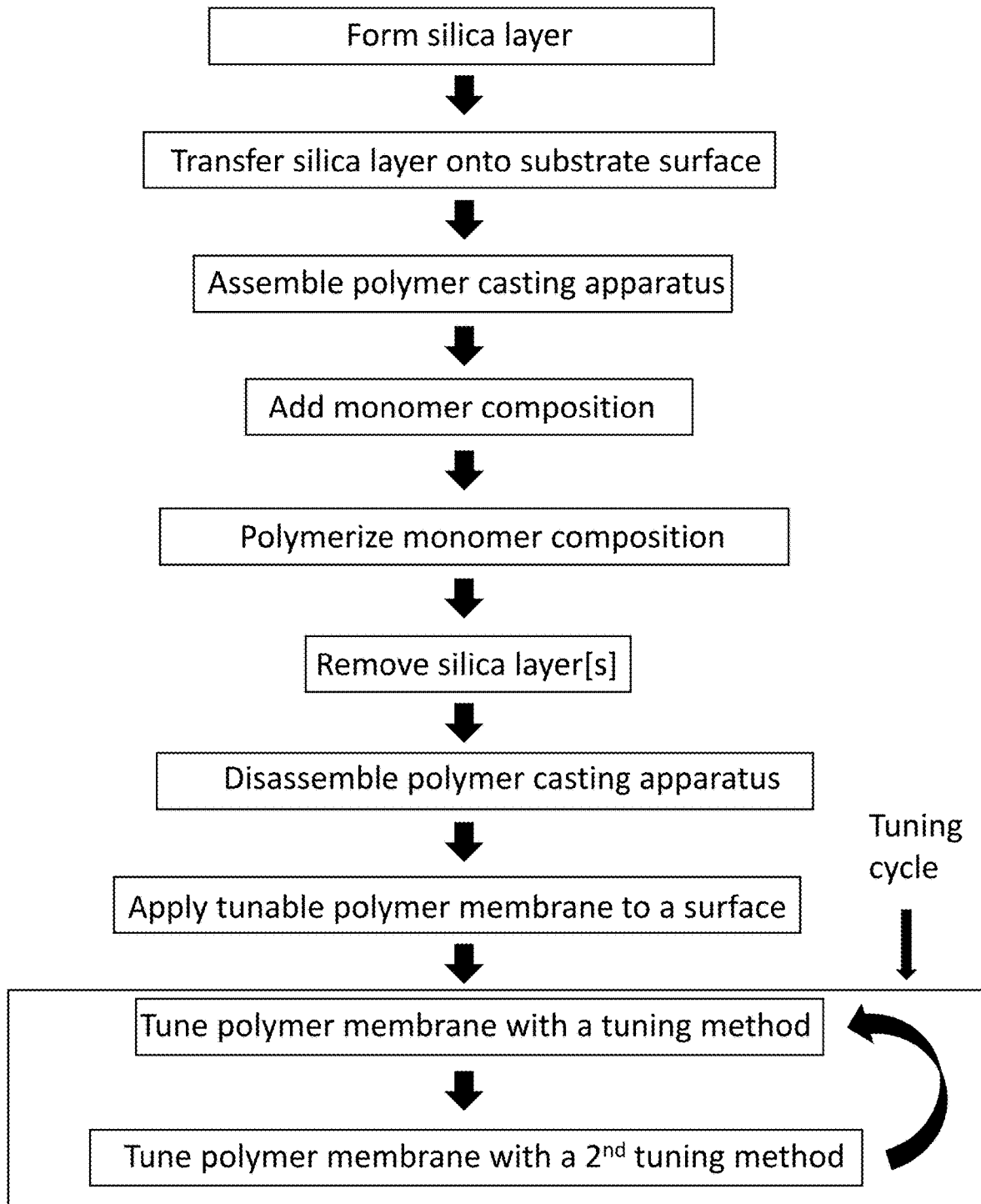
FIG. 3 illustrates a third embodiment of a method for fabricating nanoporous polymer membranes using a silica monolayer template.
Figures 4A, 4B, 4C:
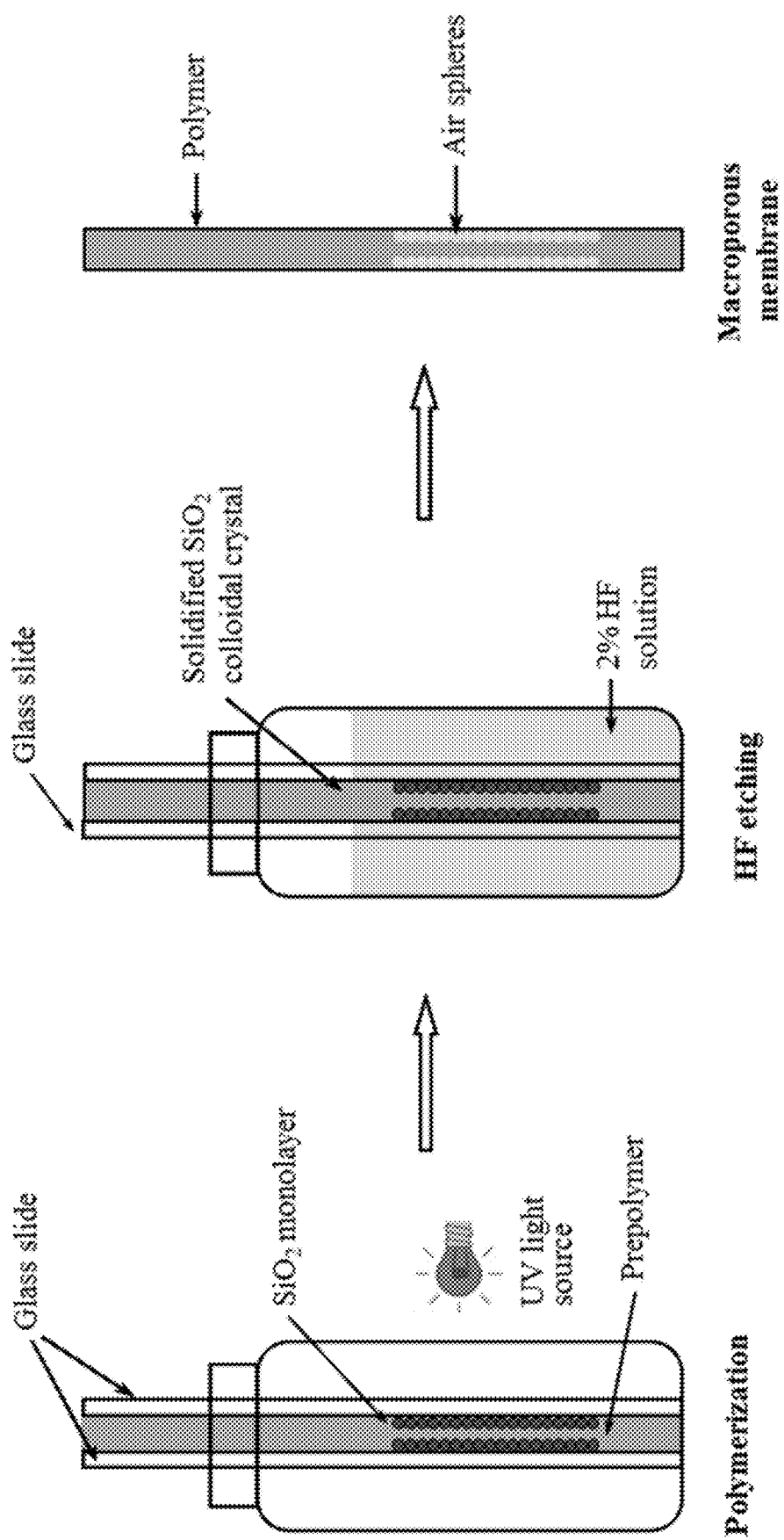
FIGS. 4A-4C illustrate a fourth embodiment of a method for fabricating nanoporous polymer membranes using a silica monolayer template, comprising polymerization (FIG. 4A), etching (FIG. 4B), and formation of the final product (FIG. 4C).

Described herein are methods and compositions for preparing tunable antireflection coatings. FIGS. 1-3 are flowcharts depicting embodiments of methods described herein. FIGS. 4A-4C show a further embodiment of a method for fabricating nanoporous polymer membranes using a silica monolayer template. As illustrated in FIGS. 4A-4C, a method can comprise polymerization (FIG. 4A), etching (FIG. 4B), and formation of the final product (FIG. 4C). In an embodiment, a method of forming a tunable antireflection coating can include forming (e.g., self-assembled) a colloidal monolayer of particles (e.g., silica) on the surface of a substrate.

In an embodiment, the colloidal monolayer of particles can be formed on the substrate by disposing the particles in a first solution (e.g., water) so that the particles cover the surface of the first solution. In an embodiment, the particles can be put into a second solution (e.g., ethylene glycol) and then disposed into the first solution. In an embodiment, the second solution causes the particles to disperse evenly across the surface of the first solution via colloidal self-assembly.

Once the particles are disposed on the surface of the first solution, the substrate can be removed from the first solution so that the particles form a colloidal monolayer on the surface of the substrate. In an embodiment, the particles can be disposed on the substrate as an ordered colloidal monolayer (e.g., a hexagonal ordering). The substrate can be disposed in the first solution prior to the addition of the particles to the first solution or the substrate can be disposed in the first solution after the addition of the particles to the first solution.

In an embodiment, the first solution can be water, ethanol, butanol, or a mixture thereof. In an embodiment, the second solution can be ethylene glycol, toluene, benzene, or a mixture thereof. In an embodiment, the first solution is water and the second solution is ethylene glycol. In an embodiment, the substrate is glass. The monolayer can be assembled across a surface of the substrate, either partially or across the whole surface.

In an embodiment, a Langmuir-Blodgett (LB) method or modified LB method can enable the formation of ordered colloidal silica monolayers on the substrate. Silica particles with a diameter of about 100 to 10,000 nm, which can be dispersed in ethylene glycol, can be added drop wise to the surface of water contained in a large glass beaker or similar container. The particles can be seen floating on the surface of the water. They can form crystalline structures on the surface of the water that can be observed due to the brilliant colors caused by Bragg diffraction of visible light. Once the entire surface of water is covered with silica particles it is left for about 10 minutes for the silica particles on the surface to form a homogeneous layer on the surface of the water. A substrate or surface of a substrate can then be slowly withdrawn from the beaker at a rate of about 0.5 mm/min. As the substrate or surface of the substrate is withdrawn it can be coated with a monolayer of silica particles. In an embodiment, the substrate is glass. In an embodiment, the substrate is a glass slide.

After the silica layer is applied, a polymer casting apparatus can be assembled. One or more substrates can be coated with a layer of silica as described above. In an embodiment, two or more substrates or a surface of two or more substrates can be coated with a silica layer. In an embodiment of a polymer casting apparatus, two or more coated substrates can be positioned in a container configured to hold a solvent in a sandwich-type configuration so that at least a surface of a first substrate coated with silica opposes a surface of a second substrate, uncoated or coated with silica. Other configurations can be realized with more than two coated substrates. In an embodiment, the coated substrates of the polymer casting apparatus are silica-coated glass.

In an embodiment, after assembly of the polymer casting apparatus, monomers or a monomer composition can be put in a space between two or more opposing silica coated surfaces of the two or more silica coated substrates. Monomers or a monomer composition that can form a polymer, a desired polymer, or a pre-determined polymer are described in more detail below.

After monomers are placed in the space, they can be polymerized by a polymerization method to form a tunable polymer membrane. The polymerization method can be photo-polymerization, wherein the monomers are polymerized by the application of light. In an embodiment, the light can be UV light and can be applied for a period of time.

The tunable polymer membrane can be made of a monomer, a monomer composition, or a polymer. In some embodiments, the monomers, monomer composition, or polymer can be a viscous and/or elastic polymer. The tunable polymer membrane can additionally be characterized by weak intermolecular forces. Further, the tunable polymer membrane can have a low Young's modulus and can therefore change shape easily. In some embodiments, the tunable polymer membrane can have a high failure strain when compared with other materials.

Following polymerization, the silica layer can be removed from the membrane and the membrane optionally washed. In an embodiment, the silica layer is removed by a solvent. In an embodiment, the silica is removed by 2% hydrofluoric acid (HF) aqueous solution. In an embodiment, the membrane can be washed by a wash solvent. In an embodiment, the wash solvent can be deionized water. The silica layer can be removed by a solvent that is placed in the container of the polymer casting apparatus in an embodiment. Removal of the silica layer can create nanopores in the polymer. The polymer or tunable polymer membrane can be nanoporous following removal of the silica layer.

In an embodiment, after removal of the silica monolayer (and optional wash), the polymer casting apparatus can be disassembled and the polymer membrane separated from the substrates that were previously silica coated. In an embodiment, the polymer membrane can be a tunable antireflective membrane and can be transferred to any surface that can be partially or fully transparent.

The tunable polymer membrane can be configured to be modified such that the level of transparency of the tunable polymer membrane can vary in response to one or more mechanical forces applied to the tunable polymer membrane. One or more mechanical forces can alter the transparency by changing the shape or configuration of the nanopores in the tunable polymer membrane. The amount of force from one or more mechanical forces can be predetermined or random; it can be continuous or variable over time; it can be across the entire surface of the tunable polymer membrane or only at partial locations, either predetermined or random.

Additionally, the one or more mechanical force(s) can be applied to the tunable polymer membrane at a single point on the tunable polymer membrane, a single end of the tunable polymer membrane, multiple ends of the tunable polymer membrane, multiple points on the tunable polymer membrane, and/or in any other configuration that can cause the tunable polymer membrane to be structurally modified to change the transparency level of the tunable polymer membrane. In some embodiments, tensile and/or compression force(s) can be applied to the tunable polymer membrane. In some embodiments, the mechanical force(s) can be applied over a tunable polymer membrane having dimensions of about 1 inch by about 1 inch. The one or more mechanical forces can be applied by anything capable of applying a mechanical force. In an embodiment, the one or more mechanical forces is applied with a stamp of polydimethoxysilane (PDMS).

The mechanical force applied to membranes as described herein can transfer uncured small molecules (oligomers) from the material that is used as the stamp to the surface of the membrane that is stamped, thereby facilitating an optical transition. In an embodiment according to the present disclosure, uncured PDMS oligomers from the PDMS stamp diffuse from the stamp to the tunable membrane upon the application of mechanical force. The diffusion of such hydrophobic PDMS oligomers changes the hydrophobicity of the macropores of the membrane that leads to a great change in the capillary pressure induced by water evaporation from the macropores The transparency of the tunable membrane can be altered by drying after application of or immersion in a solvent. The solvent can be water in an embodiment. In an embodiment, the solvent can be ethanol or another alcohol. The solvent can be another organic solvent, for example hexane. A solvent can alter the transparency by changing the shape of the nanopores in the tunable polymer membrane through a mechanism such as capillary action.

Transparency of the tunable polymer membrane can be cycled, or in other words is reversible. A transparent tunable polymer membrane as described herein can be rendered opaque by one or more mechanical forces or solvents, and the process can be cycled back or reserved. An opaque tunable polymer membrane as described herein can be made transparent by one or more mechanical forces or solvent[s], and the process can be cycled back or reversed. Tuning cycles also known as cycles of transparency as described herein can be repeated many times without altering the light transmitting properties of the tunable polymer membrane.

In an embodiment of the present disclosure, a tuning cycle for tunable membranes as described herein is described where pressure is applied to a membrane or portion of a membrane with a stamp, facilitating a first optical transition from a transparent to an opaque state, and then the membrane can be washed with a solvent and then dried, facilitating a second optical transition from opaque state back to the original transparent state. This can be a binary transition (transparent to opaque or opaque to transparent), or can be varying degrees of transition depending on the stamp, the stamp pressure, duration of the application of mechanical force by the stamp, the solvent, and/or the solvent wash time.

The methods and compositions described herein can use a large variety of shape memory polymers to form the tunable polymer membrane depending on the desired configuration of the tunable polymer membrane. Shape memory polymers as described herein can be elastic or glassy.

An elastic polymer can be a polymer that has a glass transition temperature lower than or close to room temperature. In an embodiment, a polymer as used herein can have a $T_g$ of about −40° C. In an embodiment, a copolymer of ETPTA 20 and PEGDA 600 (with ratio from 1:1 to 1:6) is elastic at ambient conditions.

A "glassy" polymer can be a polymer or copolymer with glass transition temperature higher than room temperature. A "glassy" polymer can be optically transparent. A glassy polymer as used herein can have a glass transition state ($T_g$) higher than room temperature. In an embodiment, a glassy polymer has a $T_g$ of about 120° C. In an embodiment, a glassy polymer is poly(methyl methacrylate) with a typical $T_g$ of about 100° C.

In an embodiment, a polymer or tunable polymer membrane as used herein can be polymerized polyethylene glycol diacrylate (PEGDA), polyethylene glycol (600) diacrylate (PEGDA 600), ethoxylated trimethylolpropane triacrylate (ETPTA), ethoxylated (20) trimethylolpropane triacrylate (ETPTA 20), individually or in combination. In an embodiment, a polymer as used herein can be polymerized monomers of polyethylene glycol diacrylate (PEGDA), polyethylene glycol (600) diacrylate (PEGDA 600), ethoxylated trimethylolpropane triacrylate (ETPTA), ethoxylated (20) trimethylolpropane triacrylate (ETPTA 20), individually or in combination. In an embodiment, a polymer as used herein is an elastic membrane comprising PEGDA 600 and ETPTA 20. A coating as described herein can be an elastic membrane. A coating as described herein can be an elastic membrane comprising PEGDA and ETPTA. A coating as described herein can be an elastic membrane comprising PEGDA 600 and ETPTA 20. In an embodiment, a glassy polymer can be used to form a membrane for a tunable antireflective coating. In an embodiment, ETPTA can be used to form a membrane for a tunable antireflective coating. In an embodiment, photocurable, glassy poly(methyl methacrylate) (PMMA) can be used to form a membrane for a tunable antireflective coating. In an embodiment, glassy copolymers including trifunctional acrylated urethane and tripropylene glycol diacrylate (TPGDA) can be used to form a membrane for a tunable antireflective coating.

In certain aspects, the tunable shape memory polymer can be comprised of other shape memory polymers (e.g., polyurethane-based copolymers) that show enhanced mechanical stability/durability with higher glass transition temperatures (up to 120° C.) and Young's moduli (up to ~3 GPa).

A silica nanoparticle monolayer can be used as a structural template for fabricating nanoporous polymer membranes with antireflection properties. The templating layer can also be multilayers of silica nanoparticles assembled by various methodologies, such as spin coating, dip coating, doctor blade coating, and so on. In an embodiment, the silica nanoparticles can be self-assembled or not be self-assembled and/or possess long-range ordering or not possess long-range ordering. Self-assembled silica nanoparticle monolayers can be used as described herein and can be created by a variety of methods, for example a simple and scalable Langmuir-Blodgett method as described above. As used and described herein, silica nanoparticles can be used for silica nanoparticle monolayers. Silica nanoparticles can be $Si_xO_yH_z$, synthesized by various methodologies, including the well-established Stöber method.

In an embodiment, the silica nanoparticles can be about 100 nm to about 10,000 nm. In an embodiment, silica nanoparticles are silicon dioxide ($SiO_2$). In an embodiment, a composition of silica nanoparticles has an average diameter of about 100 nm/particle. Silica nanoparticles as used herein can have a diameter of about 100 nm. In an embodiment, silica nanoparticles as used herein can be $SiO_2$ nanoparticles with a diameter of about 100 nm each.

The optical reflection of the membranes described herein can be fine-tuned by simple structural manipulation at ambient conditions. In this regard, a membrane as described herein can be considered tunable. When the nanoporous structure is in its original state, low optical reflection of light can be easily recognized. By contrast, once the nanoporous structure is distorted, high optical reflection can result. Besides optical configurability, the membranes are designed to exhibit cyclical optical transitions and, cycles of optical transition (low optical reflection to high optical reflection, or high optical reflection to low optical reflection) can be repeated many times (>100) with little to no sign of degradation. Additionally, the shape memory polymers used herein, which have very broad thermomechanical properties (e.g., glass transition temperature ranges from −40° C. to 120° C.), can exhibit unusual "cold" programming behaviors. In other words, the deformation and the recovery of the nanoporous structure can be performed at ambient (at or about room temperature) conditions without cooling or heating. This is quite different from and in stark contrast to traditional thermoresponsive shape memory polymers.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Figure 5A:
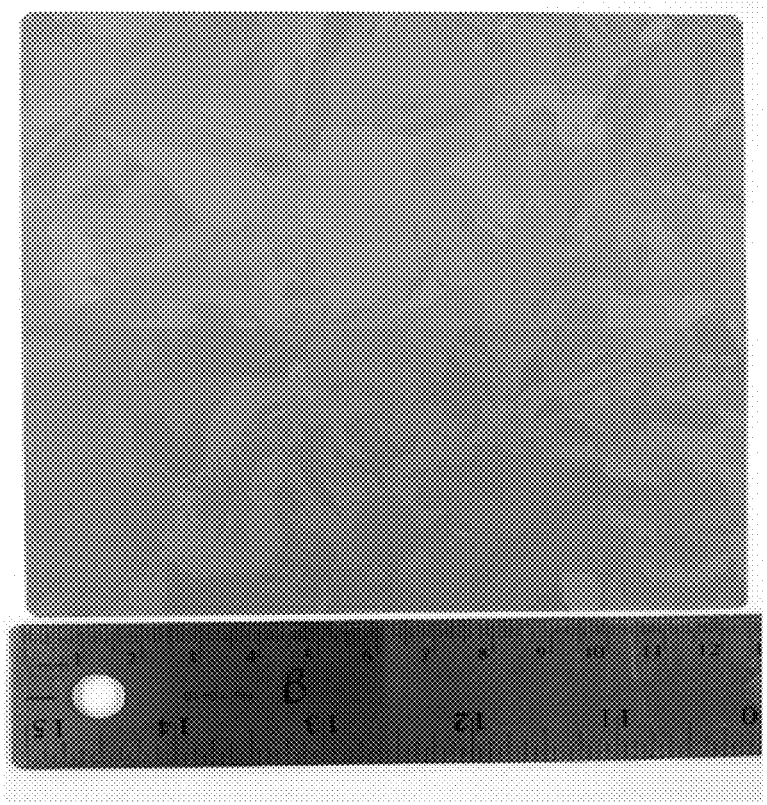
FIG. 5A is a photograph showing an example of the silica coating method described herein. A commercial solar-grade multicrystalline silicon wafer (substrate) coated with silica particles by LB method described herein is shown.
Figure 5B:
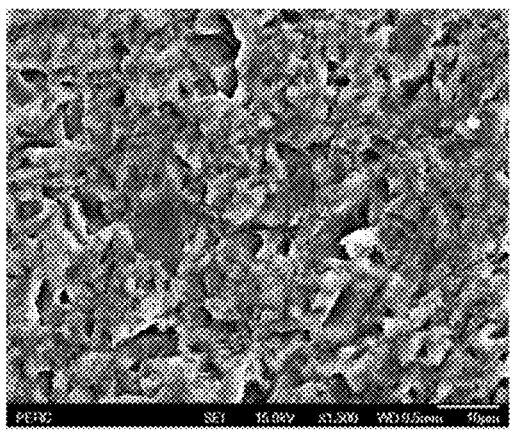
FIG. 5B shows a scanning electron microscopy image of the surface of the example shown in FIG. 5A.
Figure 5C:
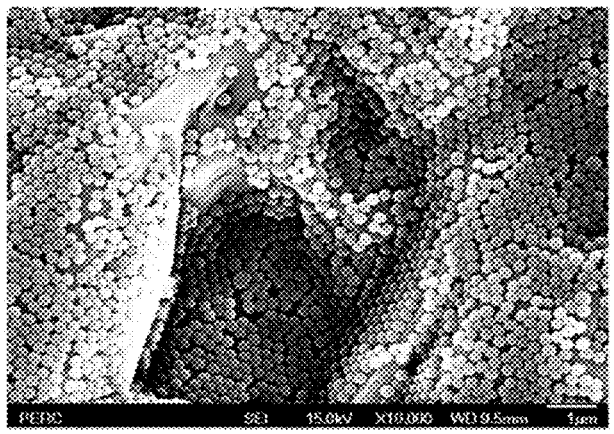
FIG. 5C is a magnified image of the sample of FIG. 5A, where the hexagonal ordering of monolayer silica particles is clearly seen from these electron microscopy images.

An example of coating a surface with a silica monolayer as described can be seen in FIGS. 5A-5C. A photograph of a substrate (a commercial solar-grade multicrystalline silicon wafer) coated with silica particles by LB method is shown in FIG. 5A. The top half of the image is the uncoated wafer and the bottom half is the coated wafer. It is apparent that the silica coating is quite uniform over the whole coated area. The LB method described above can be easily applied to coat a whole substrate, a whole surface of a substrate, a substrate in part, or a surface of a substrate in part in a continuous manner. FIG. 5B shows a scanning electron microscopy image of the surface of the substrate covered in silica particles in FIG. 5A. FIG. 5C is a magnified image of the same sample in FIG. 5A. The hexagonal ordering of monolayer silica particles is clearly seen from these electron microscopy images.

Example 2

Described herein is a methodology for fabricating smart, tunable antireflection coatings by using a large variety of shape memory polymers and resulting compositions thereof. Demonstrated herein is a know-how of tuning the optical transmission and reflection properties by controlling the nanostructures of templated nanopores at ambient conditions. This method is not only applicable to "rubbery" polymers, but can also be used to "glassy" polymers.

In an embodiment, monolayer colloidal crystals consisting of 100 nm diameter silica nanoparticles can be assembled by using an assembly method, such as a simple and scalable Langmuir-Blodgett method. The colloidal silica nanoparticles can be first assembled at an interface of air and water and subsequently transferred onto a glass substrate. After coating the glass substrate, various polymer monomers can be put in a "sandwich cell" consisting of the coated glass and a bare glass substrate. The monomers can then be polymerized, by a method such as photo-polymerization. The silica nanoparticles can then be removed by dissolving in a 2 vol % hydrofluoric acid aqueous solution and finally rinsed with deionized water. FIGS. 4A-4C show an embodiment of a procedure for fabricating nanoporous polymer membranes by using a silica monolayer as a structural template. In embodiments such as that in FIGS. 4A-4C, methods can comprise polymerization (FIG. 4A), etching (FIG. 4B), and formation of the final product (FIG. 4C). The silica monolayer can be a self-assembling monolayer.

Methods described herein can tune the structure of various nanoporous polymeric membranes with very different thermomechanical properties under ambient conditions, thereby tuning properties relating to light reflectance. When some elastic membranes, such as a copolymer of polyethylene glycol (600) diacrylate (PEGDA 600) with ethoxylated (20) trimethylolpropane triacrylate (ETPTA 20), are dried out of water, the templated nanopores can collapse because, at least in part, of the large capillary pressure created by the evaporation of water from the nanopores. The resulting membranes with deformed nanopores can show high optical reflection. By contrast, the collapsed nanopores can be "pulled" back to their original spherical nanoporous state by stamping them with a block of polydimethoxysilane (PDMS). The recovery of the original, open nanopores can lead to reduced optical reflection of the membranes. FIG. 6 shows the reflection of an embodiment of a PEGDA 600-ETPTA 20 copolymer membrane with collapsed (dried out of water) and recovered (PDMS-stamped) nanopores. The antireflective properties of the membrane can be in line with the recovery of nanopores caused by PDMS stamping.

FIG. 6 depicts a photograph of an embodiment of a PDMS-stamped nanoporous ETPTA/PEGDA membrane. The topological examination was carried out using scanning electron microscope (SEM), shown in FIGS. 7A-7B. FIG. 7A represents a top-view SEM image of the high-glare region of the embodiment in FIG. 6, showing disordered nanopores. By contrast, FIG. 7B confirms that the low-glare region of the embodiment of FIG. 6 exhibits an ordered nanoporous structure.

Figure 8:
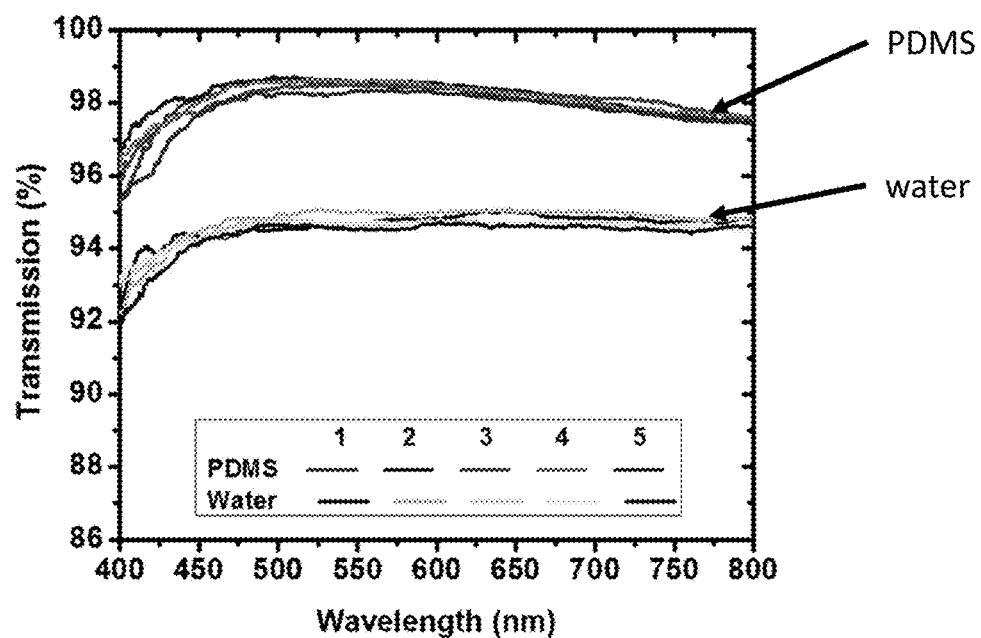
FIG. 8 illustrates normal-incidence optical transmission spectra obtained from an embodiment of a nanoporous ETPTA/PEGDA membrane cyclically stamped and dried out of water.

To demonstrate the durability and tunable antireflection properties of membranes described herein, cyclic optical measurements of an embodiment of a membrane between high and low optical transmission was performed as shown in FIG. 8. FIG. 8 shows normal-incidence optical transmission spectra that can be obtained from an embodiment of a nanoporous ETPTA/PEGDA membrane cyclically stamped and dried out of water. The resulting PDMS stamped area can show as high as 98% of transmission whereas the area directly dried out of water-only can be significantly lower.

Figure 9:
FIG. 9 shows an embodiment of a photograph of a hydraulically pressed ETPTA membrane templated from 100 nm silica nanoparticles.

Besides the above embodiment of an elastic polymer, which can have a glass transition temperature ($T_g$) of ~−40° C. (<<room temperature), the tunable antireflection technology and methods described herein can also be applied to a variety of "glassy" polymer. "Glassy" polymers can be polymers which have $T_g$ much higher than room temperature (e.g., ethoxylated trimethylolpropane triacrylate (ETPTA) with $T_g$ of 120° C.). FIG. 9 shows a photograph of an embodiment of a hydraulically pressed ETPTA membrane templated from 100 nm silica nanoparticles. FIG. 9 illustrates the reflection from an ETPTA membrane with mechanically deformed (hydraulically pressed, in the center) and original nanoporous structures (clear or transparent area surrounding the center square). The glare associated with the pressed region can be strong indication of the structure deformation for "glassy" polymers.

Top-view SEM images of the sample in FIG. 9 are shown in FIGS. 10A-10B. FIGS. 10A-10B shows top-view SEM images of the clear region (FIG. 10A) and glare region (FIG. 10B) of the embodiment show in FIG. 9. The SEM images can indicate a considerable transformation from the clear region (FIG. 10A) to the high-glare region (FIG. 10B) of the embodiment in FIG. 9. The SEM images confirm the deformation of the nanopores can be caused, for example, by the hydraulic pressing process.

Additional testing of the cyclical properties of the membrane was undertaken. FIG. 11 shows the comparison of the optical transmission between the original (open nanopores) and the deformed states. The experiments are performed to consecutively cycle (press and then dry) the deformed membranes out of ethanol, offering two optical states (high and low glare). FIG. 11 depicts normal-incidence transmission spectra obtained from an embodiment of a polymeric membrane cyclically pressed and dried out of ethanol.

Example 3

Figure 12:
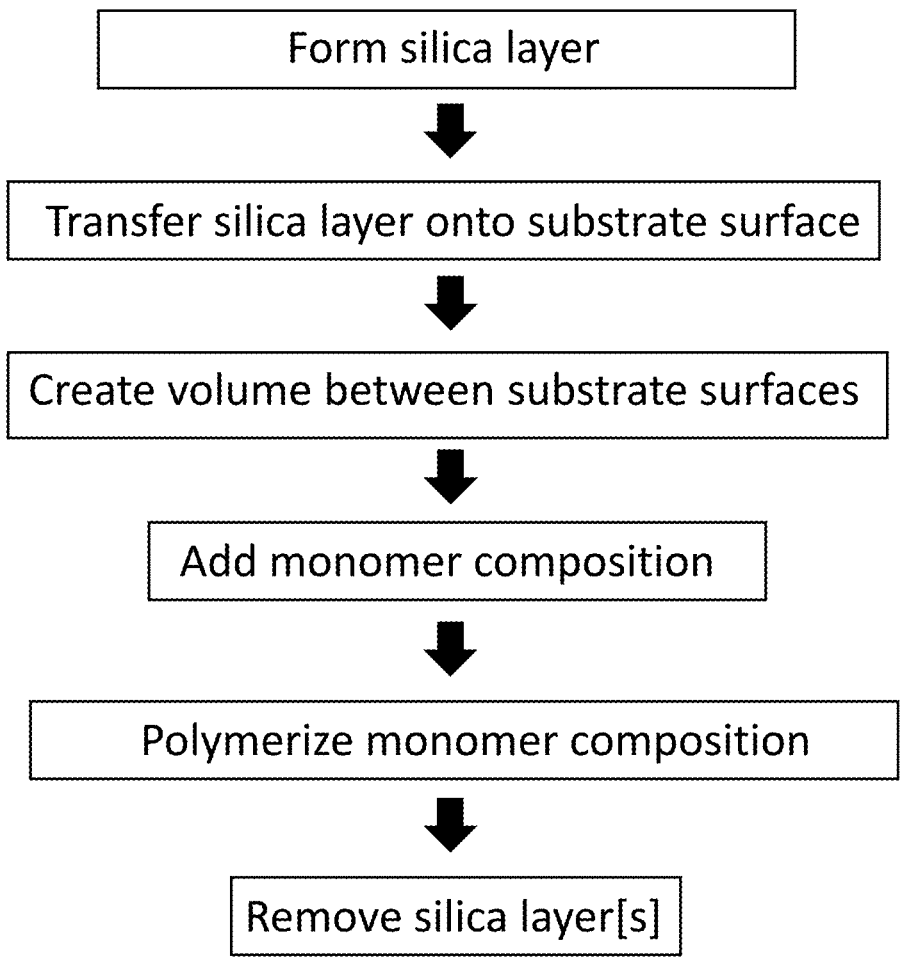
FIG. 12 illustrates an embodiment of a method for fabricating nanoporous polymer membranes using a silica monolayer template.

FIG. 12 depicts an embodiment of a method as described herein. The method of FIG. 12 can further comprise forming a silica layer with silica nanoparticles; and transferring the silica layer onto at least one surface of one or more substrates.

Example 4

In this example, embodiments of a simple polymer infusion process for controlling the antireflection (AR) and transmission properties of nanoporous polymer coatings prepared by a nanoparticle templating approach are described. The infusion of uncured polydimethylsiloxane (PDMS) oligomers from a PDMS block under mechanical pressure into monolayer nanopores induces the refractive index matching, leading to the loss of AR properties of the intrinsic nanoporous coating. The infused oligomers can be easily removed by a simple solvent wash (e.g., using hexane), resulting in the recovery of the good AR performance of the infused regions. Therefore, switchable antireflection coatings that could find many important applications in smart optoelectronic surfaces and dynamic windows have been achieved.

FIGS. 13A-13C show the schematic illustration of this polymer infusion process. Original nanoporous AR coatings were prepared by templating monolayer silica colloidal crystals assembled using a simple and scalable Langmuir-Blodgett technique. In short, silica nanoparticles with diameters ranging from 70 to 120 nm were first assembled at an air/water interface. The monolayer colloidal crystal floating on water was then transferred onto a glass substrate. The assembled silica colloidal crystals were then used as structural templates in replicating nanoporous AR coatings with both surfaces possessing ordered nanopores. Nearly all polymers including acrylates, polystyrene, polyurethane, and epoxy can be used according to this technique. When a solid PDMS block was placed on the AR coating and a small pressure was applied on the block, uncured PDMS oligomers in the block were squeezed into the interconnecting nanopores. Due to refractive index match caused by the infused oligomers, the printed regions lost the original good AR performance of empty nanopores. By simply dipping the infused coatings into common organic solvents, like ethanol and hexane, to remove the infused PDMS oligomers, the original AR performance of the printed regions was recovered.

Figure 14A:
FIGS. 14A-14D are photographs of a nanoporous AR coating film during an embodiment of the cyclic switching process as described herein.
Figure 14B:
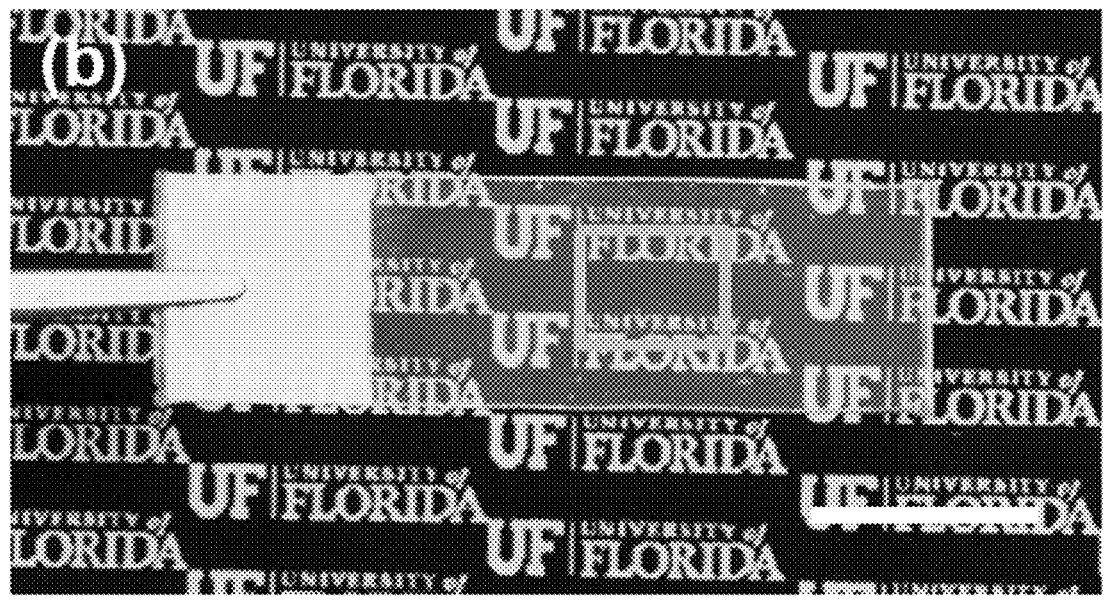
Figure 14C:
Figure 14D:

FIGS. 14A-14D are photographs of a templated nanoporous AR coating during a cyclic switchable process as described herein. The sample was prepared by templating self-assembled silica monolayer colloidal crystals consisting of 110 nm nanoparticles. The sample exhibits good AR performance as the underneath words are visible (FIG. 14A). In sharp contrast, the leftmost part of the sample does not have templated nanopores and therefore it is high reflective, impeding the readability of the words underneath it. When a cleaned PDMS block with no uncured oligomers in it was placed on the AR coating, no degradation in the AR performance was noticed (FIG. 14B). The uncured oligomers in this PDMS block were removed by a 24-hour hexane wash at room temperature. By contrast, when a PDMS with ~10 wt. % oligomer was pressed on the AR coating, the underneath regions immediately lost the original AR properties, leading to the highly reflective rectangular pattern shown in FIG. 14C. The recovery of the initial AR performance can be easily achieved by washing away the infused PDMS oligomers using a simple hexane wash (FIG. 14D).

Figure 15A:
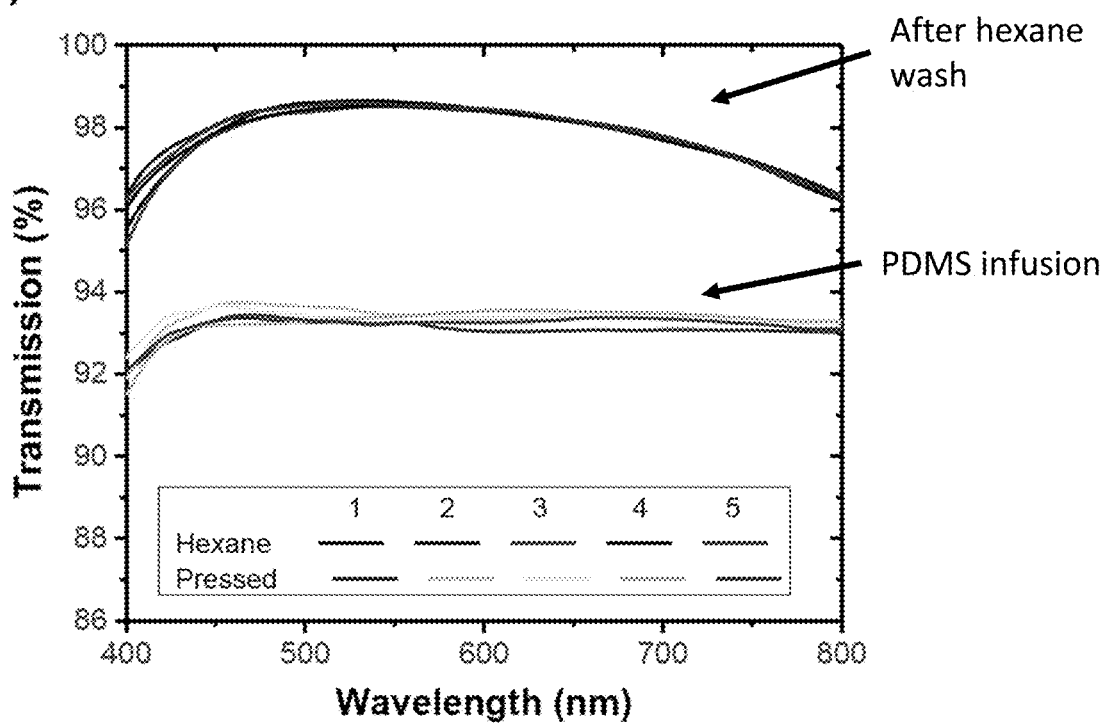
FIGS. 15A and 15B are graphs showing optical characterization of switchable AR properties.
Figure 15B:
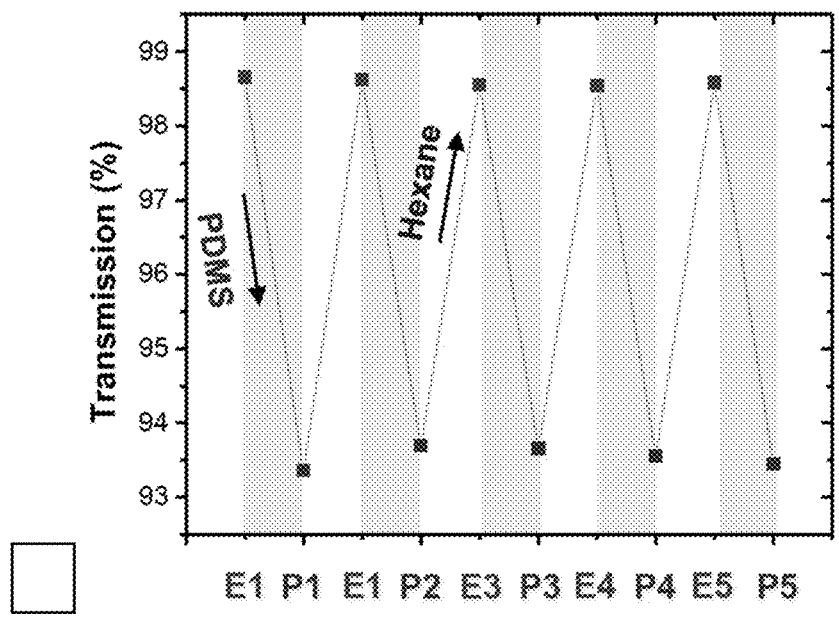

The cyclic AR performance of the switchable AR coatings can be characterized by optical transmission measurements. FIG. 15A compares the normal-incidence optical tramission spectra obtained from a nanoporous AR coating sample after 5-time PDMS infusion processes, followed by hexane wash after each infusion. It is apparent that all infused samples show high low light transmission; while the hexane-washed samples exhibit high transmission. This cyclic change in light transmission was further shown in FIG. 15B by comparing the transmittance at 500 nm wavelength during the above cyclic operations.

Figure 16A:
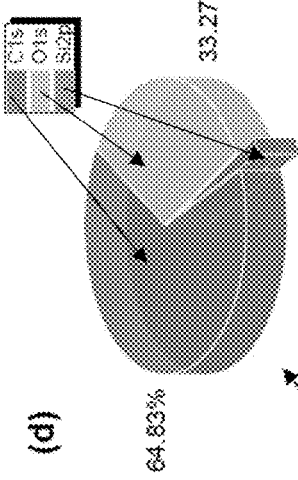
FIGS. 16A-16D are x-ray photoelectron spectroscopy (XPS) spectra (FIG. 16A) and the corresponding elemental compositions of an intact polyacrylate AR coating sample (FIG. 16B), and the sample PDMS infusion (FIG. 16C) following by a brief hexane wash (FIG. 16D).
Figure 16B:
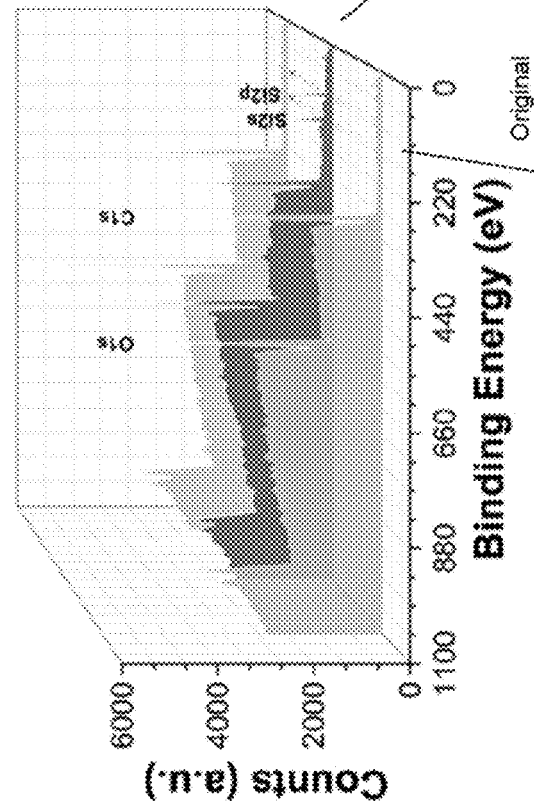
Figure 16C:
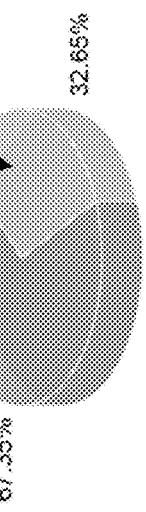
Figure 16D:
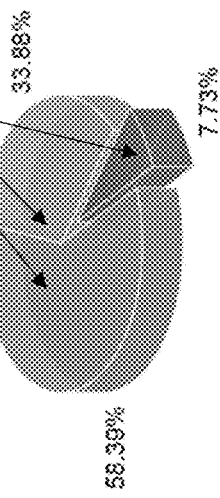

To confirm the PDMS oligomer infusion mechanism, X-ray photoelectron spectroscopy (XPS) elemental analysis was utilized. FIG. 16A compares the XPS spectra obtained from an intact polyacrylate nanoporous AR coating, and the sample polymer film after PDMS printing, followed by a brief hexane wash. The pie charts in FIGS. 16B-16D compare the elemental compositions of the final samples. It is clear that the intact polymer AR coating sample (FIG. 16B) contains only carbon and oxygen (hydrogen is not shown in the XPS spectrum). The PDMS-infused sample (FIG. 16C) contains ~7.73% silicon which was originated from the infused PDMS oligomers. The hexane-washed sample (FIG.

16D) still contains ~1.9% silicon as the brief hexane wash only partially removed the infused PDMS oligomers.

Figure 17B:
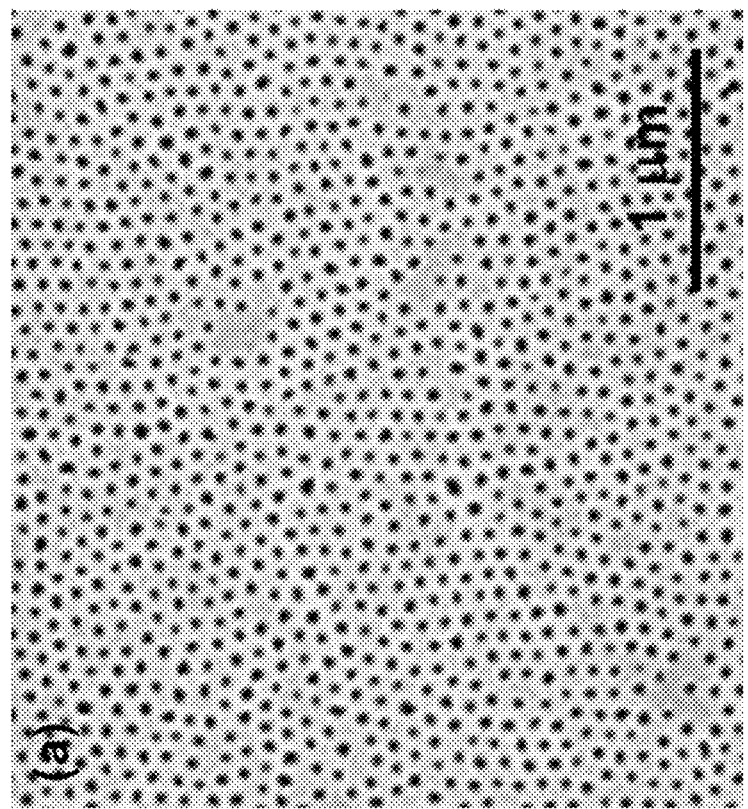
FIGS. 17A-17F are SEM images showing the structural changes during the cyclic infusion-washing process.
Figure 17A:
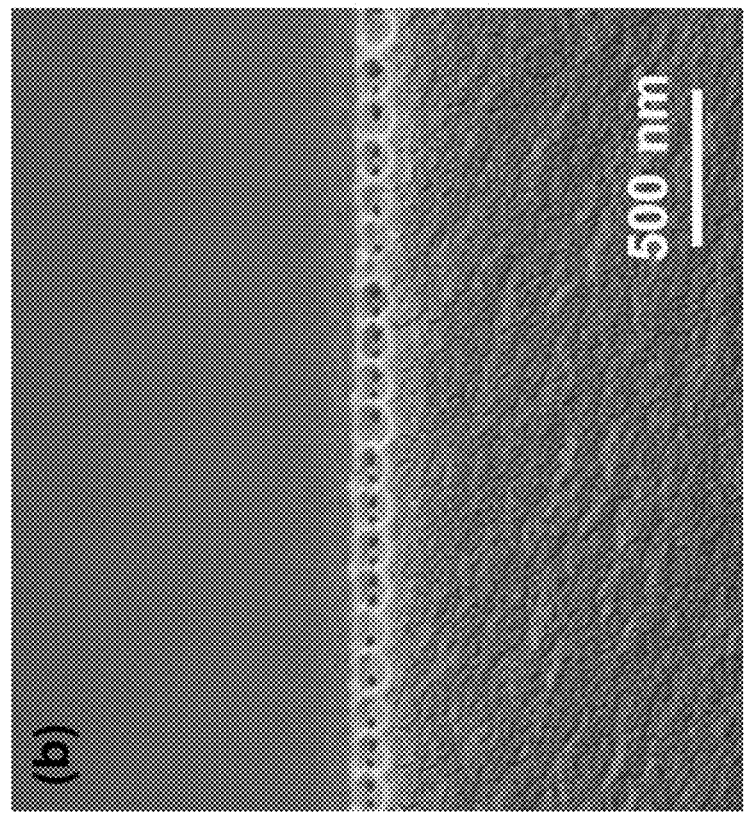
Figure 17D:
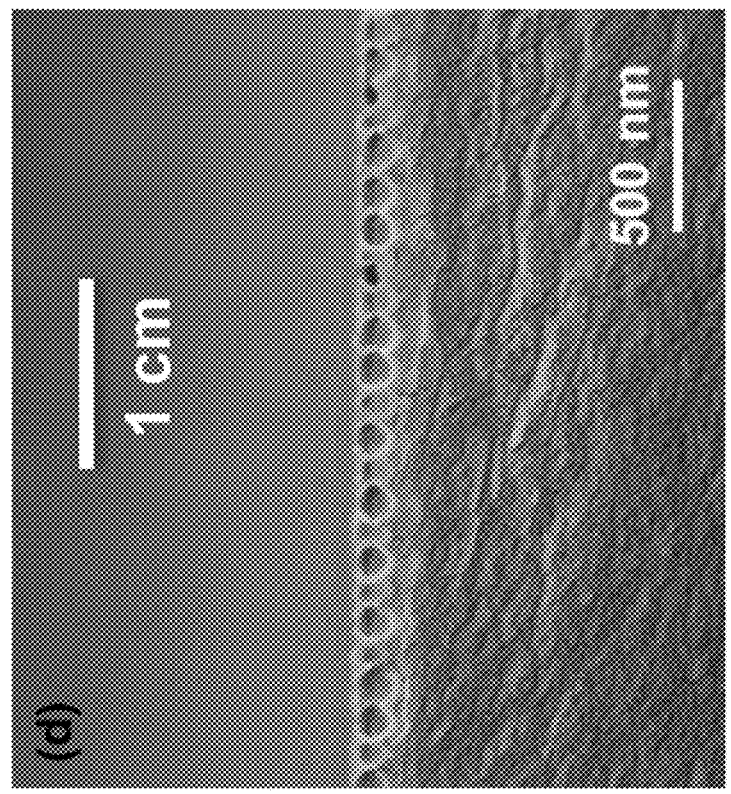
Figure 17C:
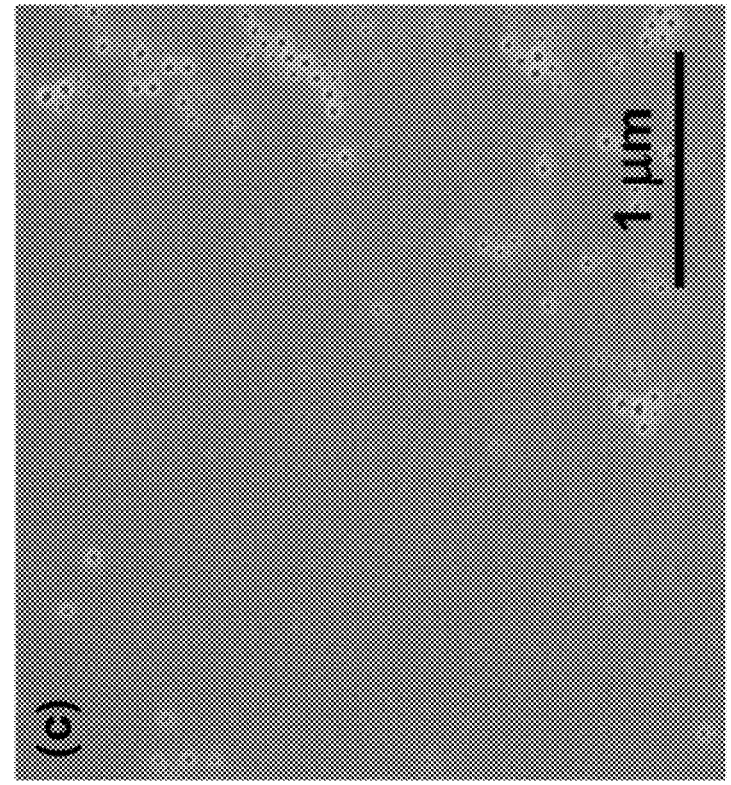
Figure 17F:
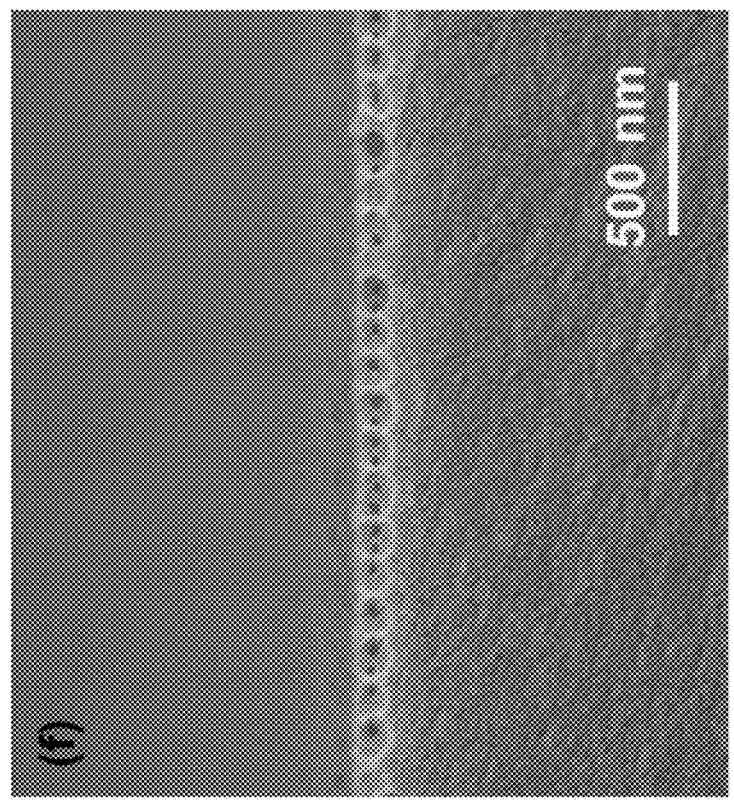
Figure 17E:
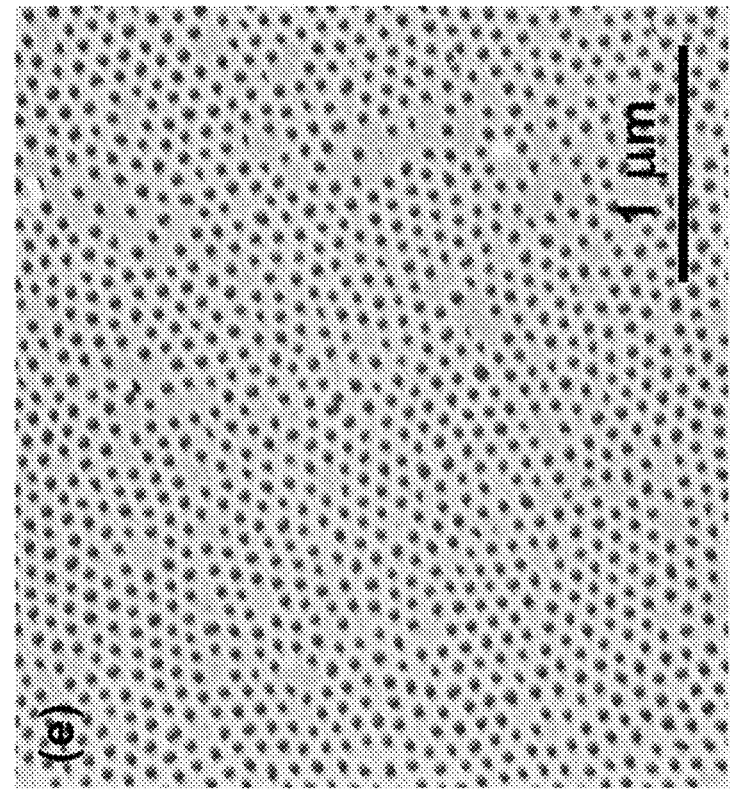

The scanning electron microscope (SEM) images in FIGS. 17A-17F further confirm the oligomer infusion mechanism. FIG. 17A and FIG. 17B show the top-view and cross-sectional view of a templated polyacrylate nanoporous AR coating consisting of 110 nm nanopores. After PDMS oligomer infusion, the SEM images in FIG. 17C and FIG. 17D reveal that the nanopores were mostly filled up. After hexane wash, the SEM images in FIG. 17E and FIG. 17F demonstrate the recovery of the original nanoporous structure of the original sample.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method for fabricating a tunable polymer membrane, comprising:
    forming at least one silica layer with silica nanoparticles;
    transferring the at least one silica layer onto at least one first surface of one or more substrates;
    creating a volume between the first surface and at least one opposing second surface of a second substrate;
    adding a monomer composition into the volume between the opposing first and second surfaces;
    polymerizing the monomer composition with a polymerization method to form a tunable polymer membrane; and
    removing the at least one silica layer on the one or more substrates with a first solvent;
    tuning the tunable polymer membrane with a first tuning method, thereby facilitating a first optical transition of the tunable polymembrane to a first tuning state;
    wherein the first tuning method is application of a force to a surface of the tunable polymer membrane, and the first optical transition is transparent to opaque; and
    wherein the application of force is with a PDMS stamp comprising uncured PDMS oligomers configured to diffuse to the tunable polymer membrane upon the application of force with the PDMS stamp on the tunable membrane.

2. The method of claim 1, further comprising:
    washing the tunable polymer membrane with a second solvent after removing the silica layers.

3. The method of claim 1, wherein the silica nanoparticles are $SiO_2$ nanoparticles with a diameter of about 100 nm to about 10,000 nm.

4. The method of claim 1, wherein the silica layer is a monolayer of colloidal silica crystals.

5. The method of claim 1, wherein the one or more substrates comprise glass.

6. The method of claim 1, further comprising transferring the at least one silica layer onto at least one second surface of the second substrate.

7. The method of claim 1, wherein the monomer composition comprises polyethylene glycol (600) diacrylate (EGDA 600), ethoxylated trimethylolpropane triacrylate (ETPTA), ethoxylated (20) trimethylolpropane triacrylate (ETPTA 20), or a combination thereof.

8. The method of claim 1, wherein the first solvent is 2 volume % hydrofluoric acid.

9. The method of claim 1, further comprising applying the tunable polymer membrane to a surface.

10. A method of tuning a tunable polymer membrane, comprising:
    providing a tunable polymer membrane;
    tuning the tunable polymer membrane with a first tuning method, thereby facilitating a first optical transition of the tunable polymembrane to a first tuning state;
    tuning the tuned polymer membrane with a second tuning method, thereby facilitating a second optical transition to a second tuning state;
    wherein the first tuning method is application of a force to a surface of the tunable polymer membrane, and the first optical transition is transparent to opaque; and
    wherein the application of force is with a PDMS stamp comprising uncured PDMS oligomers configured to diffuse to the tunable polymer membrane upon the application of force with the PDMS stamp on the tunable membrane.

11. The method of claim 10, wherein the second tuning method is washing the tunable polymer membrane with a solvent, and the second optical transition is opaque to transparent.

12. The method of claim 11, further comprising initiating a tuning cycle wherein the first tuning state, second tuning state, or both are cycled for more than one cycle.

13. The method of claim 12, wherein the tuning cycle alters the optical transmission of the tunable membrane from a first optical transition of below 94% to a second optical transition above 98% or a first optical transition of above 98% to a second optical transition below 94%.

14. The method of claim 13, wherein the first tuning method is applying a force to a surface of the tunable polymer membrane or washing the tunable polymer membrane with a solvent.

15. The method of claim 13, wherein the second tuning method is applying a force to a surface of the tunable polymer membrane or washing the tunable polymer membrane with a solvent.

16. The method of claim 10, wherein the first tuning method and second tuning method are different.

17. The method of claim 14, wherein the solvent is ethanol or hexane.

\* \* \* \* \*